United States Patent
Yokoo

(10) Patent No.: US 11,577,612 B2
(45) Date of Patent: Feb. 14, 2023

(54) SYSTEM FOR ADJUSTING REGENERATIVE TORQUE ACCORDING TO STATE OF CHARGE OF MULTIPLE BATTERIES

(71) Applicant: Toyota Motor Engineering & Manufacturing North America, Inc., Plano, TX (US)

(72) Inventor: Takehito Yokoo, Aliso Viejo, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 18 days.

(21) Appl. No.: 17/217,120

(22) Filed: Mar. 30, 2021

(65) Prior Publication Data

US 2022/0314809 A1 Oct. 6, 2022

(51) Int. Cl.
*B60K 1/00* (2006.01)
*B60L 7/10* (2006.01)
*B60L 50/75* (2019.01)
*B60L 58/18* (2019.01)
*B60L 58/12* (2019.01)

(52) U.S. Cl.
CPC ............... *B60L 7/10* (2013.01); *B60L 50/75* (2019.02); *B60L 58/12* (2019.02); *B60L 58/18* (2019.02); *B60L 2240/423* (2013.01)

(58) Field of Classification Search
CPC .................................. B60L 7/10; B60L 58/18
See application file for complete search history.

(56) References Cited

U.S. PATENT DOCUMENTS

| | | | |
|---|---|---|---|
| 6,886,647 B1 | 5/2005 | Gotta | |
| 10,449,848 B2 | 10/2019 | Storm | |
| 11,325,502 B2 * | 5/2022 | Kong | ........................ B60K 7/00 |
| 2008/0276824 A1 * | 11/2008 | King | ..................... B60W 20/13 191/4 |
| 2010/0152940 A1 * | 6/2010 | Mitsutani | .............. B60W 10/08 180/65.23 |
| 2014/0052318 A1 | 2/2014 | Yoshida et al. | |
| 2018/0215247 A1 * | 8/2018 | D'Amato | ............... B60K 6/387 |
| 2018/0244258 A1 * | 8/2018 | Mouri | .................. B60W 10/08 |
| 2019/0248223 A1 * | 8/2019 | Janson | .................. F16H 37/084 |
| 2020/0164755 A1 * | 5/2020 | Smolenaers | ............ B60L 53/24 |
| 2021/0291803 A1 * | 9/2021 | Gesang | ............... B60L 15/2045 |

FOREIGN PATENT DOCUMENTS

CN 201863701 U 6/2011

* cited by examiner

*Primary Examiner* — Jared Fureman
*Assistant Examiner* — Esayas G Yes Haw
(74) *Attorney, Agent, or Firm* — Christopher G. Darrow; Darrow Mustafa PC

(57) ABSTRACT

A powertrain for an electric vehicle has a driveshaft connected to two or more motors where each motor is connected to a battery pack associated with that motor. A controller is used to select one or more motors to be energized for propulsion or used for regenerative braking to recharge the battery pack to which it is coupled. The controller can optimize the state of charge (SOC) difference of the battery packs and provide for a smooth and efficient powering of the vehicle for acceleration and climbing and optimize the range of the vehicle by management of the relative SOC of the battery packs. The electric vehicle can include two or more fuel cells that individually coupled to a motor.

20 Claims, 4 Drawing Sheets

SYSTEM FOR ADJUSTING REGENERATIVE TORQUE ACCORDING TO STATE OF CHARGE OF MULTIPLE BATTERIES

TECHNICAL FIELD

The present disclosure generally relates to a system of multiple motors in an electric powertrain for a vehicle, where the regenerative torque is maintained at a target level to maintain a state of charge and/or balance of two or more batteries.

BACKGROUND

In the field of electric vehicles (EVs), regenerative braking is employed to transform the kinetic energy from the deaccelerating wheels where the electric motor imposes a negative torque to the wheels to slow the vehicle. This results in an energy recovery where the motor is in a generator mode that charges the batteries that are the energy source of the vehicle. The regenerative function can occur any time the motor rotation and torque are of opposite angular orientation.

There are relatively few configurations of motor and battery commonly employed where most include a single drive motor and one battery pack, although the use of two electrical motors is becoming common with electric vehicles, where the configuration is for a separate motor to drive the front wheels and another for the rear wheels. Motors directly at each wheel is also available. A single battery pack is used with all production EVs.

The use of a dual battery system, where a high energy density pack is employed in a charge depleting mode and a high power density pack is employed in a charge sustaining mode and coupled with one or two bidirectional DC-DC converters, has been shown to provide efficiency advantages to a single battery system having an identical energy capacity. However, the system may have disadvantages from leakage currents, less stable bus voltages, or converter losses. The exploitation of coupled motors, each individually powered by its own battery pack, presents some advantages for maintaining battery balance and regenerative charging of the batteries when used in electric vehicles or in conjunction with fuel cell vehicles.

SUMMARY

This section provides a general summary of the disclosure and is not a comprehensive disclosure of its full scope or all its components.

In various aspects, the present teachings provide for an electric vehicle with an electrical motor system that includes a plurality of battery packs and a plurality of motors that are on a common driveshaft. In this manner, the controlled system can adjust regenerative torque according to the balance of the different battery packs in a manner that optimizes the overall system. Each battery pack can address one of the motors, such that the battery packs can be balanced by the selective employment of the motors for propulsion or for battery charging. One or more of the batteries can be powering the wheels at any time where, for a pair of motors, both can draw from their battery packs when appropriate, such as when an additional torque is required during acceleration of the vehicles or climbing a grade. While traveling at a constant speed on a flat road, one motor can be under load to provide power, while the other can be in a no-load situation or intermittently could be used in a regenerative charging mode. On descending a grade or deaccelerating, both motors can be in a regenerative mode or one can be in a no-load situation while the other is in a regenerative mode. The system can selectively charge one of the battery packs to balance the battery packs' charges. The controller selects the motor or motors for performing drive, acceleration, or breaking.

In other aspects, the present teachings provide a method for providing a diesel-like torque response to a vehicle by employing a plurality of electric motors where each is associated with its own battery pack(s), and to maintain a balance of charge between two or more battery packs. A vehicle being propelled at a constant speed can received a rapid boost in torque where a single motor powering the vehicle is joined by energizing a second motor from a second battery pack such that acceleration is rapidly achieved. Conversely, with little or no power drawn from one motor propelling the vehicle, a balance of charge may be adjusted by powering the regenerative mode of the other motor sharing a common driveshaft. In this manner, the coupling of power from two or more motors can increase torque instantaneously. The ability to engage an additional motor for acceleration allows for an instant increase in torque to the driveshaft. An ability to engage a plurality of motors for regenerative braking is advantageous, particularly for heavy vehicles, to reduce the torque at the wheels rapidly or smoothly. This is also advantageous where a vehicle employs multiple fuel cells and battery packs, where the fuel cells independently driving electric motors can be engaged as required for acceleration or climbing, where providing additional torqued may be needed upon demand. This can be of advantage for trucks and other large vehicles where a rapid increase in torque is needed for acceleration and much force is required for braking.

In other aspects, the present teachings provide for a fuel cell vehicle including two or more electrical motors on a common driveshaft where each motor is addressed by an individual fuel cell. The vehicle may include one or more battery packs for supplementation of the power and provide a regenerative braking function. The vehicle has the capacity for balancing and can adjust the output torque provided to the wheels by the energizing of one or both motors. The vehicle has the capacity for selectively addressing the motors and their fuel cells to apply an appropriate torque to the driveshaft based on the work required from the motor(s) and to provide the rapid increase in torque that can be provided by engaging a second motor.

BRIEF DESCRIPTION OF THE DRAWINGS

The present teachings will become more fully understood from the detailed description and the accompanying drawings, wherein.

Figure 1:
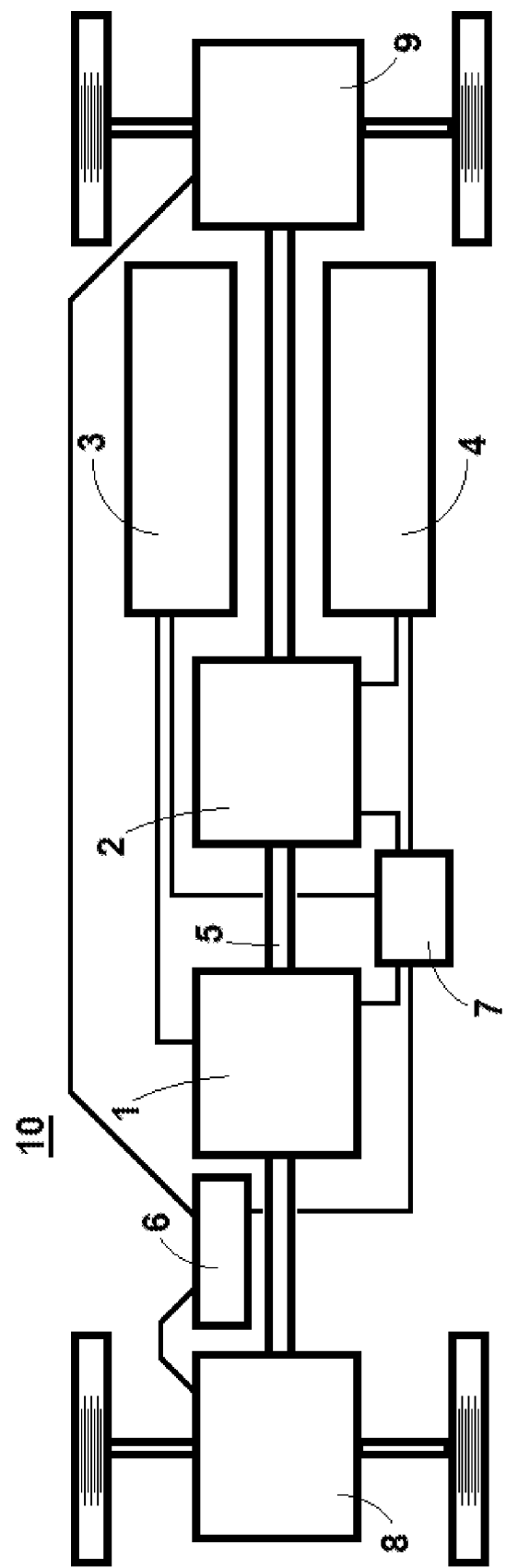
FIG. 1 is a block diagram of powertrain 10 of a dual electric motor vehicle, wherein the energy is provided to motors 1 or 2 sharing a common driveshaft 5 from battery packs 3 and 4, respectively.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate components from a combination of figures.

DETAILED DESCRIPTION

The present technology generally provides a powertrain for an electric vehicle where two or more electric motors share a common driveshaft. The drive shaft can be attached to a rotor, or equivalent component, of two or more motors. Each motor is powered by its own battery pack, and each battery pack can be charged regeneratively from a motor connected electrically to the battery pack. The other battery pack can be idle, power auxiliary functions of the vehicle, or even be in a charging state when its motor is not providing power to the wheels. The two motors can be effectively identical, such that the two motors can rotate at the same rotational speed with the same torque when advantageous, or the two motors can be different such that a digital drive can adjust the current draw to assure there is no adverse strain imposed on either of the two motors because of sharing a common driveshaft. One motor can be singularly energized and providing torque whereas the other's rotor can be freely spinning under a no-load condition, with only a small amount of frictional loss and very little drag. This disclosure often indicates two motors that are coupled to their own battery pack, however, additional motors on the driveshaft and additional battery packs can be included, and the selective powering of a portion of the motors by a portion of the battery packs can be selected and employed in like manner to that of selecting from two motors in a powertrain containing only two motors.

While one motor is providing locomotion, the other can intermittently act in a regenerative mode to recharge its coupled battery pack, for example, if for some reason the battery packs become significantly out of balance in an undesired fashion and there is not sufficient charge in one battery pack to effectively perform simultaneous powering of the motors. While at a cruising velocity, the vehicle can be powered by one battery of higher state of charge (SOC), and during deacceleration, regenerative braking can be performed by the other motor that is coupled to the battery pack and is in the lower SOC. In this manner, the propulsion can be provided by the motor coupled to the battery pack with the higher SOC and the regenerative braking can be provided to the battery with the lower SOC. A battery management system (BMS) can be tightly coupled with a controller to optimize the SOC and optimize the torque provided by the two motors.

In another aspect, the present teachings provide a method for providing a diesel-like torque response to a vehicle by employing a plurality of electric motors each associated with its own battery pack(s), its own fuel cell electric source, or both, while allowing a protocol for balancing of batteries that is not available for electric vehicles have a single battery pack. The vehicle being propelled at a constant speed can received a rapid boost in torque where a single motor powering the vehicle is joined by energizing a second motor from a second battery pack such that acceleration is smoothly and rapidly achieved. In this manner, the coupling of power to two or more motors provides a power response common to diesel engine powered vehicles and smoother to that of internal combustion vehicles having an ignition system. The ability to engage the second motor for acceleration allows for an instant increase in torque to the driveshaft. An ability to engage two motors for regenerative braking is advantageous, particularly for heavy vehicles, to rapidly reduce the torque at the wheels. This is advantageous where the vehicle employs a plurality of fuel cells with battery packs, such that the fuel cells independently driving electric motors can be simultaneously engaged as needed to provide the additional torque for smooth acceleration or climbing upon demand as perceived by the controller. During a descent or braking, the controller employed can be configured to determine from the state of charge which motor(s) to use to charge one or more of the battery packs. The motors can be connected to more than one battery pack in the vehicle such that a recharging of a battery can be performed by multiple motors including a motor not associated with the battery pack for locomotion of the vehicle.

In another aspect, the present teaching provides a method of adjusting regenerative torque to maintain the balance of a plurality of battery packs by a selective charging of one or more battery packs. The battery packs are individually connected to a motor-generator such that one or the other of the motors can provide at least some current generation for a balancing charge to a battery pack during a braking event or even while the other motor provides power for locomotion. The controller may include, or be coupled to, a battery management system (BMS) such that an assessment of the state of the charge in addition to the torque needs for locomotion such that recharging of, generally the lower charged battery pack can be selectively charged. It may be advantageous to have a battery pack imbalance if required for a sufficient charging capacity to perform braking. The plurality of motors is coupled by sharing a common driveshaft. The regenerative torque can be directed such that a minimum charge difference is maintained between the battery packs such that any power needed for smooth acceleration or ascending a rise or hill can be provided by energizing both motors. In general, one motor is in communication with one battery pack, although the other battery pack may address that battery pack or that motor and improve the balance and range.

In another aspect, the present teaching provides for an electric vehicle that has a powertrain that includes two or more motors on a common driveshaft and has two or more battery packs for independently energizing the motors. The electric vehicle can also include two or more fuel cells that individually address two or more motors.

FIG. 1 shows a vehicle powertrain 10 having two motors, 1 and 2 that share a common driveshaft 5 to provide power to at least two wheels of a vehicle. Although not shown, the two motors 1 and 2 can share a common housing if advantageous for space or other considerations. Front and rear differentials 8 and 9 with axles connected to front and/or rear wheels are shown, where the differential can include or be coupled with a transmission that engages or disengages the driveshaft 5 to the front or rear axles. A controller 6 can be connected to, or otherwise in communication with: one or more pedals (or equivalent) for acceleration and deacceleration, to a steering device in a non-autonomous vehicle, or to the appropriate sensors in an autonomous vehicle. The controller 6 is generally configured to control an engagement of power and braking of the front and rear differentials 8 and 9 to provide the most efficient deployment as a front wheel drive, rear wheel drive, or all-wheel drive vehicle. This controller 6 may be coupled to a battery management system 7 to direct the charging and discharging of two battery packs 3 and 4, where a first motor 1 is connected to a first battery pack 3, and a second motor 2 is connected to a second battery pack 4. The controller 6 may also connected to the battery management system 7 such that the SOC of each battery pack 3 and 4 are coupled with the appropriate discharging capability and charging need of each battery pack. The controller 6 can determine which motor(s) are best used for propulsion or regenerative charging of its battery pack based on the SOC and torque required for driving the wheels or braking. The controller 6 can direct other non-propulsion functions of the vehicle, such as heating, cooling, lights, information, and entertainment, to be directed to either of the battery packs, for example, a battery pack that is not providing power to the wheels.

To most efficiently run the system of two or more motors on a single driveshaft, where each is coupled to its own battery pack, the torque requirements of the vehicle, the SOCs of the battery packs, the rotational speed of the drive shaft, the torque of each motor, and the voltage applied by each battery pack battery is optimized for the motors' torque characteristics. Power loss coefficients may be provided to the controller 6, where an algorithm maintains a favorable battery pack balance within a range where accelerating and regenerative charging capabilities are optimized by the controller. Additionally, the controller may consider the angle of the wheels and the incline of the vehicle to optimize efficiency by selecting the drive to be performed by the front wheels, the rear wheels or both. In this manner, the energizing of one or both of motors is carried out to optimize power efficiency and balance the battery packs for their function, which may be of equal SOC or of different SOC, such that at least one can be used effectively for regenerative braking. The controller 6 may determine the proper combination of motors, the voltage applied to the motors for vehicle motion, and the current applied to the batteries for charging.

Figure 2:
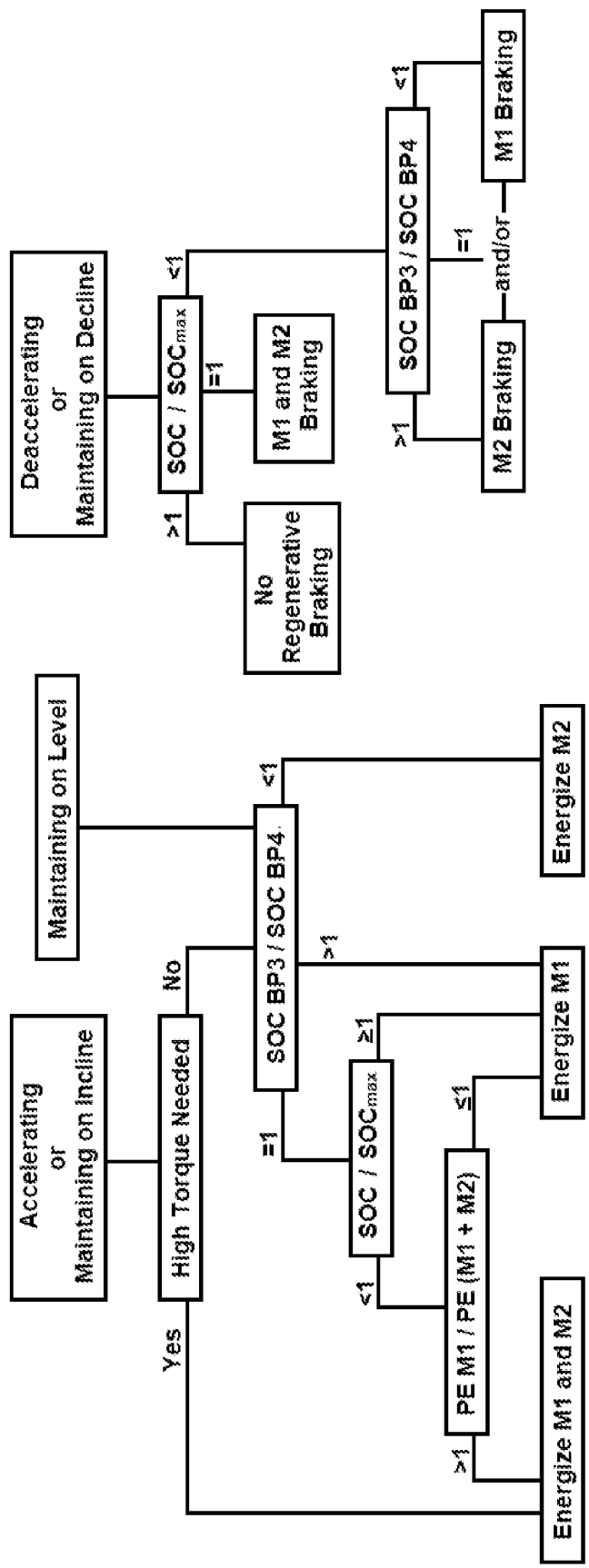
FIG. 2 is a flow sheet for the use of two or more motors for providing torque or for regenerative braking.

As indicated in FIG. 2, a controller may use instantaneous driving data, the torque needed for the current situation, and the battery packs' SOC as input for the determination of which motor should be energized to establish a desired relative SOC within the maximum and minimum of the SOC. A maximum SOC, often about 80% of total capacity, may be set as effectively the full charge. The requirements of the trip include those actions that require moderate to high drive torque transfer from the motor(s) to the wheels, such as accelerating and climbing a hill; modest drive torque from the motor(s) to maintain a vehicle's speed on more or less level ground; and those events that can provide regenerative torque from the wheels to the motor(s) for deacceleration on braking or maintaining speed during the descent of hill. After determining the conditions by the torque at the motors, the instantaneous rate of acceleration is measured, such that the required torque allows the most effective mode of energizing the first motor (M1) and/or the second motor (M2). Where relatively high torque is needed, energizing M1 and M2 from battery packs (BP3 and BP4), respectively, can be required. The algorithm used to determine the required torque will be more specific to the actual torques that are considered high for the specific motors used, but, in general, a high torque event can require the energizing of both motors to provide that torque. When high torque is not required, the most efficient use of the motors is determined to retain as much driving range as possible upon consideration of the relative SOC of BP3 and BP4 for identifying the appropriate use of M1 and M2. In general, the battery pack of higher SOC is employed. If the SOC of each battery pack is effectively equal, being within a SOC window of relative SOCs, if the battery pack is near, at, or above an effective full charge ($SOC_{max}$) the energizing of one motor, M1, is prescribed to reduce the SOC of its associated battery pack BP3, such that at least one battery can participate in regenerative braking when required. When the SOC of both battery packs is well below the $SOC_{max}$, the power efficiency profile for the use of one motor relative to using both motors can be used to determine if the energizing of both battery packs would contribute to extending the vehicle's range.

As indicated in FIG. 2, similar considerations may be made by the controller to direct a regenerative braking scenario. The algorithm for discharging the battery packs and energizing the motors is constructed to promote sufficient battery capacity, a SOC less than $SOC_{max}$, and direct regenerative braking, although under some circumstances, such as a freshly charged vehicle or after descending a very long hill, sufficient capacity may not exist. At a $SOC_{max}$, set as, for example, 80% of a total charge, regenerative braking can be performed employing both battery packs and both motors. For SOCs below this level, the relative SOC can be used to determine if both or one or the other motor is to be used.

Figure 3:
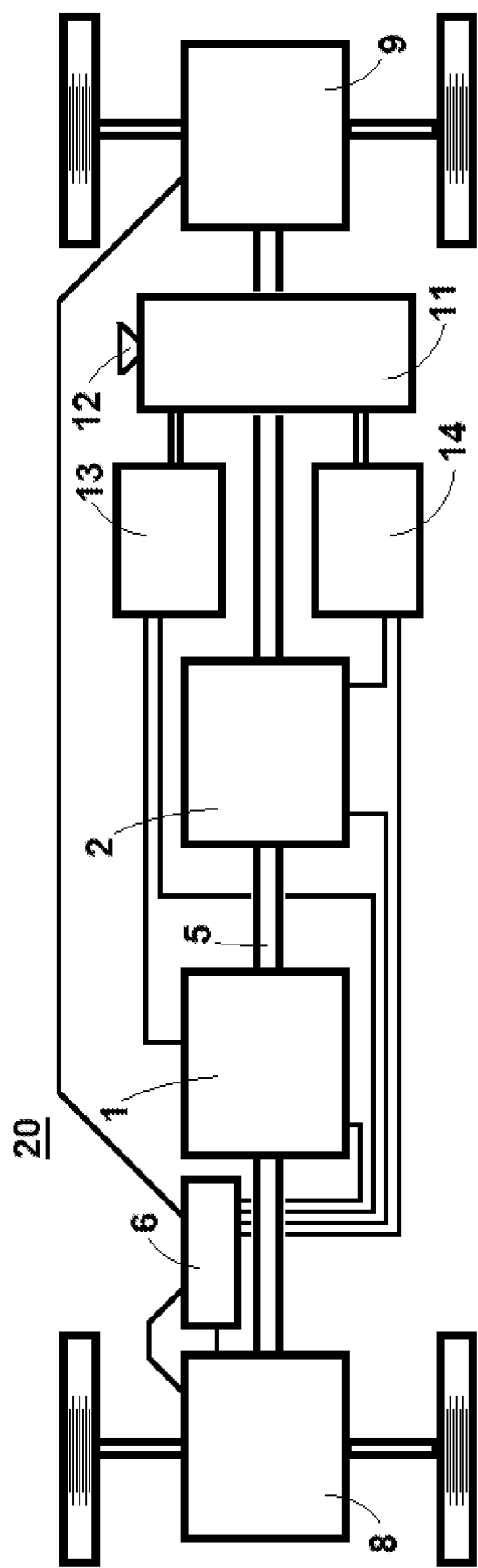
FIG. 3 is a block diagram for a powertrain 20 of a dual electric motor vehicle, wherein the energy is provided to motors 1 or 2 sharing a common driveshaft 5 by fuel cells 13 and 14, respectively.

The vehicle powertrain using two motors, 1 and 2 that share a common driveshaft 5 can be extended to a fuel cell vehicle, as illustrated in FIG. 3. Two different fuel cells 13 and 14 can be connected to motor 1 and motor 2, respectively, as shown where the fuel cells 13 and 14 are fluidly connected with a common fuel tank 11 and fuel filling port 12. Although virtually all fuel powered vehicle contains a battery, a battery is not illustrated in FIG. 3 as the advantages for additive torque by two motors does not necessarily require batteries. One or both motors 1, 2 can be engaged by the controller 6 to direct the power output of the vehicle, where the fuel cells can be appropriately sized to provide the maximum electrical energy that an individual motor may require. This is done while one fuel cell powers the drive motor and the other fuel cell may provide power for other functions of the vehicle, such as heating, cooling, lights, information, and entertainment. The non-drive fuel cell remains available for acceleration or climbing beyond that capable of one fuel cell and motor combination, when a single motor is insufficient or the dual mode otherwise optimizes acceleration and climbing. This allows each fuel cell to be used close to its optimal conditions and capabilities even when the power requirements vary over an entire range of driving conditions.

Figure 4:
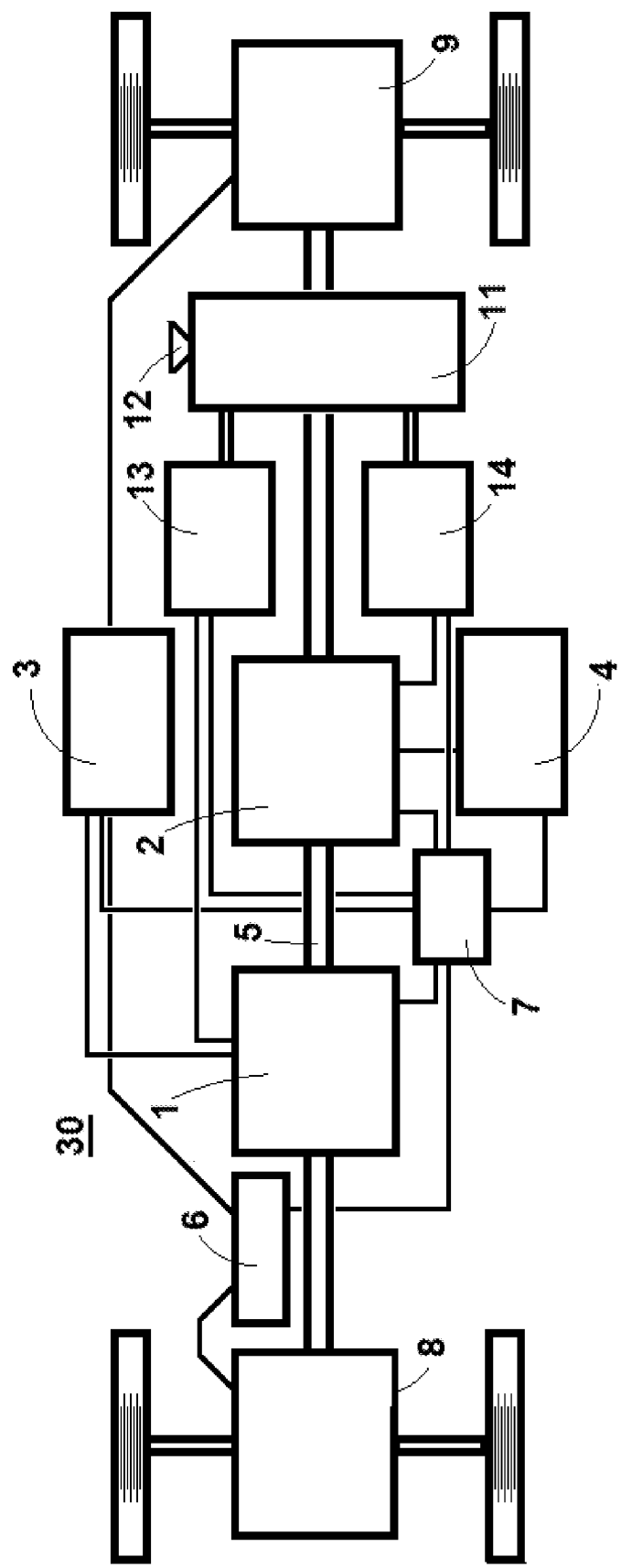
FIG. 4 is a block diagram for a powertrain 30 of a dual electric motor vehicle, wherein the energy is provided to motors 1 or 2 sharing a common driveshaft 5 by fuel cells 13 and 14 or from battery packs 3 and 4, respectively.

FIG. 4 shows a vehicle powertrain 10 using two motors 1 and 2 that share a common driveshaft 5, where two fuel cells 13 and 14 are included with two battery packs 3 and 4, for selectively energizing motors 1 and 2, respectively. The battery packs 3 and 4, fuel cells 13 and 14, and motors 1 and 2 may all be in communication with the controller 6, as shown, but not necessarily, with all interfacing through the BMS 7. Generally, the controller 6 is connected to, or incorporated with, the BMS 7. The battery packs 3 and 4, can be selectively employed for energizing the motors, to perform regenerative braking, and/or powering non-propulsion functions of the vehicle, in coordination with the fuel cells in the vehicle. The battery packs can be maintained in a SOC that can be balanced or unbalanced to readily allow for their optimal discharging and charging functions. For example, the SOC may be maintained at a level where at least one battery pack is available for regenerative braking, preferably where both are at a SOC that allows hard braking to be distributed across both battery packs. The controller 6 can select one motor or both motors for locomotion or for regenerative braking. At a low SOC, one or more of the fuel cells can be employed to charge one or more of the battery packs. One of the fuel cells can be employed to energize non-propulsion functions within the vehicle while the other provides for propulsion.

For larger vehicles, such as trucks or tractors, the use of a pair of motors coupled on a single driveshaft is particularly advantageous for provide a smooth increase in power for acceleration or traveling up an incline when a first motor is at or near its maximum torque output. The diesel-like function is in addition to the system's ability to optimize the capabilities of the individual components of the system.

The motors can be of any type configured for use in an electric vehicle. The motor can be a permanent magnet synchronous motor, a synchronous reluctance motor, an AC induction motor, or a DC motor. The rechargeable batteries of the battery packs can be of any type, including lithium ion, lithium sulfur, molten salt, and nickel metal hydride batteries. The fuel cells can be a hydrogen fuel cell, such as a polymer electrolyte membrane fuel cell, solid oxide fuel cell, or any other type of fuel cell using any fuel.

In various aspects, the controller 6 may be configured to work with the battery management system 7 and other input devices such as an accelerator pedal and a brake pedal, or their equivalents. The controller's output can be to the battery packs 3 and 4 via the battery management system 7 or to a switching device for applying a current from the battery packs to their associated motors 1 and 2. An interface system may be included to coordinated output to the motors, where the input provided concerning torque and SOC may be augmented by that from a steering wheel or sensor of the force applied at each wheel or axle such that an operation with a selectively engageable differential can choose between set of wheels for driving the vehicle.

The controller can have one or more module with at least one processor and may include one or more modules for data store or memory and one or more interface systems. The controller's processor(s) can be a main processor of the vehicle, such as an electronic control unit (ECU). The data store can include volatile and/or non-volatile memory. Suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store may contain the algorithms or operational software required to correlate the levels of variable considered for optimizing the powertrain and to direct the actuators to establish the selected combinations for locomotion and braking.

In one or more aspects, particularly for autonomous vehicle, one or more internal communication system can provide information to the controller and may include other communication module and/or devices configured to send and receive communications between various vehicle components and vehicle systems. The communication module/device may be configured to be able to work with wireless technology for sending/receiving communication and may include one or more output system devices configured to receive wireless communications from external devices for GPS services and warnings of upcoming areas of construction or road hazards and for input of destinations for the vehicle. A vehicle's user may use a personal electronic device or personal communication device, such as a phone, tablet, or other smart device that can be configured to use a specific application, or "App," to communicate with at least one the controller through a communication system for remote entry or exchange data or information.

The foregoing description is provided for purposes of illustration and description and is in no way intended to limit the disclosure, its application, or uses. It is not intended to be exhaustive or to limit the disclosure. Individual elements or components of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure and are not intended to limit the disclosure of the technology or any aspect thereof. The recitation of multiple embodiments having stated components is not intended to exclude other embodiments having additional components, or other embodiments incorporating different combinations of the stated components.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or components does not exclude other embodiments of the present technology that do not contain those elements or components.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:
1. A powertrain for an electric vehicle, comprising:
a plurality of motors;
  a driveshaft connected to the plurality of motors;
  a plurality of battery packs, each coupled to one of the plurality of motors; and
  a controller configured to:

receive an input of an instantaneous torque on the driveshaft and an input of an instantaneous torque of each of the plurality of motors;

receive an input of a state of charge (SOC) of each of the plurality of battery packs; and select at least one of the plurality of motors for energizing and de-energizing according to a magnitude of the SOC in the battery pack coupled to the motor such that the at least one of the plurality of motors is energized when the at least one of the plurality of motors is coupled to one of the plurality of battery packs with a higher SOC compared to another one of the plurality of battery packs.

2. The powertrain for an electric vehicle according to claim 1, wherein each motor is exclusively coupled to a different battery pack.

3. The powertrain for an electric vehicle according to claim 1, wherein each motor comprises: a permanent magnet synchronous motor, a synchronous reluctance motor, an AC induction motor, or a DC motor.

4. The powertrain for an electric vehicle according to claim 1, wherein the plurality of motors are disposed in a common housing.

5. The powertrain for an electric vehicle according to claim 1, wherein each battery pack comprises a plurality of lithium ion, lithium sulfur, molten salt, or nickel metal hydride batteries.

6. The powertrain for an electric vehicle according to claim 1, wherein the controller is connected to, or is incorporated with, at least one battery management system.

7. The powertrain for an electric vehicle according to claim 1, further comprising a plurality of fuel cells, wherein each fuel cell is coupled with one of the motors of the plurality of motors.

8. The powertrain for an electric vehicle according to claim 7, wherein each fuel cell is exclusively coupled with one of the battery packs of the plurality of battery packs.

9. The powertrain for an electric vehicle according to claim 7, wherein each fuel cell comprises a hydrogen fuel cell.

10. The powertrain for an electric vehicle according to claim 1, further comprising a front differential on a front axle and a rear differential on a rear axle, wherein the controller is configured to direct a reversible coupling of the front axle and/or the rear axle to the driveshaft.

11. The powertrain for an electric vehicle according to claim 1, wherein the controller is connected to, or is incorporated with, at least one battery management system.

12. A method of adjusting torque on a drivetrain and balancing a state of charge (SOC) of a plurality of battery packs for an electric vehicle, comprising:

providing a driveshaft connected to a plurality of motors;

providing a plurality of battery packs, each coupled to one of the plurality of motors;

receiving, by a controller, an input of an instantaneous torque on the driveshaft and an input of an instantaneous torque of each of the plurality of motors;

receiving, by a controller, an input of a SOC of each of the plurality of battery packs;

selecting at least one motor coupled to the battery pack of a higher SOC for energizing and selecting at least one motor coupled to the battery pack of a lower SOC for de-energizing;

energizing at least one, but less than all of, the plurality of motors by at least one, but less than all of, the plurality battery packs for propulsion of the vehicle to have at least one motor under load and at least one motor in a no-load situation; and additionally energizing or de-energizing at least one motor in a no-load situation to provide additional torque to the driveshaft based on a magnitude of the instantaneous torque on the driveshaft.

13. The method according to claim 12, wherein the step of selecting the at least one motor for additional energizing at least one motor in a no-load situation occurs when an input of the instantaneous torque on the driveshaft is at a maximum torque or increasing toward a maximum torque available from the at least one motor under load.

14. The method according to claim 12, wherein the step of additionally de-energizing at least one motor under load occurs when the instantaneous torque on the driveshaft is below a maximum torque or is decreasing from the maximum torque available from the at least one motor under load.

15. The method according to claim 12, further comprising:

determining, by the controller, that a direction of the instantaneous torque is opposite a direction of rotation of the driveshaft; and alternatively selecting at least one motor for regenerative braking according to the SOC of the battery packs.

16. The method according to claim 15, wherein the step of alternatively selecting at least one motor comprises selecting at least one motor with a SOC below a maximum SOC and is the at least one motor with a lowest SOC.

17. An electric vehicle, comprising:

a powertrain comprising: plurality of motors;

a driveshaft connected to the plurality of motors;

a plurality of battery packs, each coupled to one of the plurality of motors; and a controller configured to:

receive an input of an instantaneous torque on the driveshaft and an input of an instantaneous torque of each of the plurality of motors;

receive an input of a state of charge (SOC) of each of the plurality of battery packs; and select at least one of the plurality of motors for energizing and de-energizing according to a magnitude of the SOC in the battery pack coupled to the motor such that the at least one of the plurality of motors is energized when the at least one of the plurality of motors is coupled to one of the plurality of battery packs with a higher SOC compared to another one of the plurality of battery packs.

18. The electric vehicle according to claim 17, wherein the controller is connected to, or is incorporated with, at least one battery management system.

19. The electric vehicle according to claim 17, further comprising a plurality of fuel cells, wherein each fuel cell is coupled with one of the motors of the plurality of motors.

20. The electric vehicle according to claim 19, wherein each fuel cell is exclusively coupled with one of the battery packs of the plurality of battery packs.

* * * * *